US007925924B2

(12) United States Patent
Acedo et al.

(10) Patent No.: US 7,925,924 B2
(45) Date of Patent: Apr. 12, 2011

(54) METHOD FOR COMMAND LINE INTERFACE RESTORE POINTS WITH SUPPORT FOR AN ATOMIC SETS OF COMMANDS

(75) Inventors: Mario Francisco Acedo, Tucson, AZ (US); Ezequiel Cervantes, Tucson, AZ (US); Paul Anthony Jennas, Tucson, AZ (US); Jason Lee Peipelman, Vail, AZ (US); Matthew John Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 12/408,858

(22) Filed: Mar. 23, 2009

(65) Prior Publication Data
US 2010/0241842 A1 Sep. 23, 2010

(51) Int. Cl.
*G06F 11/00* (2006.01)
(52) U.S. Cl. .......................................................... 714/19
(58) Field of Classification Search ...................... 714/19
See application file for complete search history.

(56) References Cited

U.S. PATENT DOCUMENTS

| 6,327,627 | B1 * | 12/2001 | Orton et al. .................... 719/328 |
| 6,385,616 | B1 * | 5/2002 | Gardner ............................... 1/1 |
| 6,453,328 | B1 * | 9/2002 | Schaeffer et al. ............. 715/202 |
| 6,470,482 | B1 * | 10/2002 | Rostoker et al. .............. 716/102 |
| 2003/0120690 | A1 * | 6/2003 | Schaeffer et al. ............. 707/500 |
| 2003/0131146 | A1 * | 7/2003 | Lam et al. ...................... 709/320 |
| 2003/0204612 | A1 * | 10/2003 | Warren ......................... 709/230 |
| 2004/0139193 | A1 * | 7/2004 | Refai et al. ..................... 709/224 |
| 2007/0050661 | A1 * | 3/2007 | Ferren et al. ....................... 714/1 |
| 2008/0104217 | A1 | 5/2008 | Srinivasa et al. |
| 2008/0109737 | A1 * | 5/2008 | Schaeffer et al. ............. 715/753 |
| 2008/0126302 | A1 * | 5/2008 | Mora et al. ........................ 707/3 |
| 2008/0177994 | A1 * | 7/2008 | Mayer .............................. 713/2 |
| 2009/0217163 | A1 * | 8/2009 | Jaroker ........................ 715/700 |

FOREIGN PATENT DOCUMENTS

EP 1772803 5/2007

* cited by examiner

*Primary Examiner* — Bryce P Bonzo
(74) *Attorney, Agent, or Firm* — Connolly Bove Lodge & Hutz LLP; Robert Sullivan

(57) ABSTRACT

The present invention introduces methods for controlling and configuring systems using a new command line interface (CLI) command. The CLI command allows a user to set a save point or a restore point of the configuration (e.g., setsavepoint). After the CLI command is executed, the user can continue issuing configuration commands. In addition, if at some point the user wants to go back to the restore point, the user can issue an additional command which generates a CLI script containing all of the commands that need to be executed in order to modify the configuration such that it goes back to its state at the point at which the restore point was set.

1 Claim, 2 Drawing Sheets

METHOD FOR COMMAND LINE INTERFACE RESTORE POINTS WITH SUPPORT FOR AN ATOMIC SETS OF COMMANDS

FIELD OF THE INVENTION

The present invention relates generally to the field of management of storage systems. More specifically the present invention is directed to a method for command line interface restore points with support for an atomic sets of commands.

BACKGROUND OF THE INVENTION

When using a Command-Line Interface (CLI) to configure a storage subsystem, there are often times when a user would like to have the ability to restore the configuration of a machine to a previous state. On order to do so, the background art requires the user to determine the commands needed to reverse the operations that they were just executed to configure the storage subsystem. This task requires a lot of planning to ensure that the commands determined are correct. Thus, there is a need in the art to more efficiently restore the configuration of the machine to a previous state.

SUMMARY OF THE INVENTION

The present invention introduces a new command line interface (CLI) command that allows a user to set a save point or a restore point of the configuration (e.g., setsavepoint), wherein, after this command is executed, the user can continue issuing configuration commands. In addition, if at some point the user wants to go back to the restore point, the user can issue an additional command which generates a CLI script containing all of the commands that need to be executed in order to modify the configuration such that it goes back to its state at the point at which the restore point was set.

One embodiment of the present invention is directed to a method for controlling system configurations using a command line interface which allows a user to accurately undo previously issued configuration commands comprising: receiving a set restore point command from a user configured to mark initiation of a set of storage system configuration commands for removal; creating and storing an undo configuration command complementary to said storage system configuration commands, wherein each command issued by a user is subsequent to receipt of said set restore point command; storing each said undo configuration command; creating a sequence of said undo configuration command in reverse order of creation in response to a remove command issued by said user, and executing a sequence of undo configuration commands to remove the complementary configuration commands corresponding to each said undo command.

Another embodiment of the present invention is directed to a method for configuring systems using a command line interface allowing any user selected group of configuration commands to be automatically and accurately removed if any configuration command in the group fails. In particular, the method comprises: receiving a start group command to mark initiation of a group of configuration commands to be implemented as a group and, in response setting a restore point marker to initiate creation of a set of undo commands complementary to each configuration command in said group of commands which are to be implemented only if each command in said group does not fail. In addition, for each subsequent configuration command issued by said user, the method comprises: creating a complementary undo command; storing each said undo command; and in response to an indication of any configuration command issued by said user subsequent to receiving said start group command failing, triggering execution of said stored sequence of undo commands in reverse order of creation. Further, in response to an end of group command from said user without an indication of any configuration command issued subsequent to said start of group command failing, the method further comprises removing said restore point marker and terminating creation of said undo commands.

BRIEF DESCRIPTION OF THE DRAWINGS

The invention can be described in greater detail with the aid of the following drawings.

DETAILED DESCRIPTION OF THE PREFERRED EMBODIMENT

In the present invention, in order to generate the CLI script needed to restore the configuration, the CLI will store an undo command for every configuration command that is issued after a restore point is set. For example, if the user sets a restore point and then executes a command to create a volume, then a command to delete the volume will be stored in memory. In addition, a second new CLI command allows the user to generate a script of the undo commands that, when run, takes the configuration of the machine back to the state of the configuration at the time when the save point was established. An example of such a command would be "genundoscript."

In addition, the commands would need to be written to the script in the reverse order in which they were generated. For example, if a user created a rank and then created a volume using that rank, the first line of the script would need to have the command to delete the volume followed by the command to delete the rank. The user could then execute the script which would cause the configuration to be modified such that it is restored to its state at the restore point. This could also be extended to allow for functionality where a user could use commands in a CLI script that allows a particular set of commands to be atomic (i.e. all succeed or all fail). For example, the user might have a portion of the script that creates arrays, ranks, extent pools, and volumes but if some of the volumes fail to be created then they don't want the partial configuration from the other volumes, the extent pools, ranks, and arrays that were just created. So that set of atomic commands would be undone to allow the configuration on the machine to return to its state before any of these objects were created. To do so, the script would have commands that mark the set of commands as atomic and if a command within the set of commands failed, the CLI would then automatically execute undo commands to remove any configuration added beyond the restore point.

Figure 1:
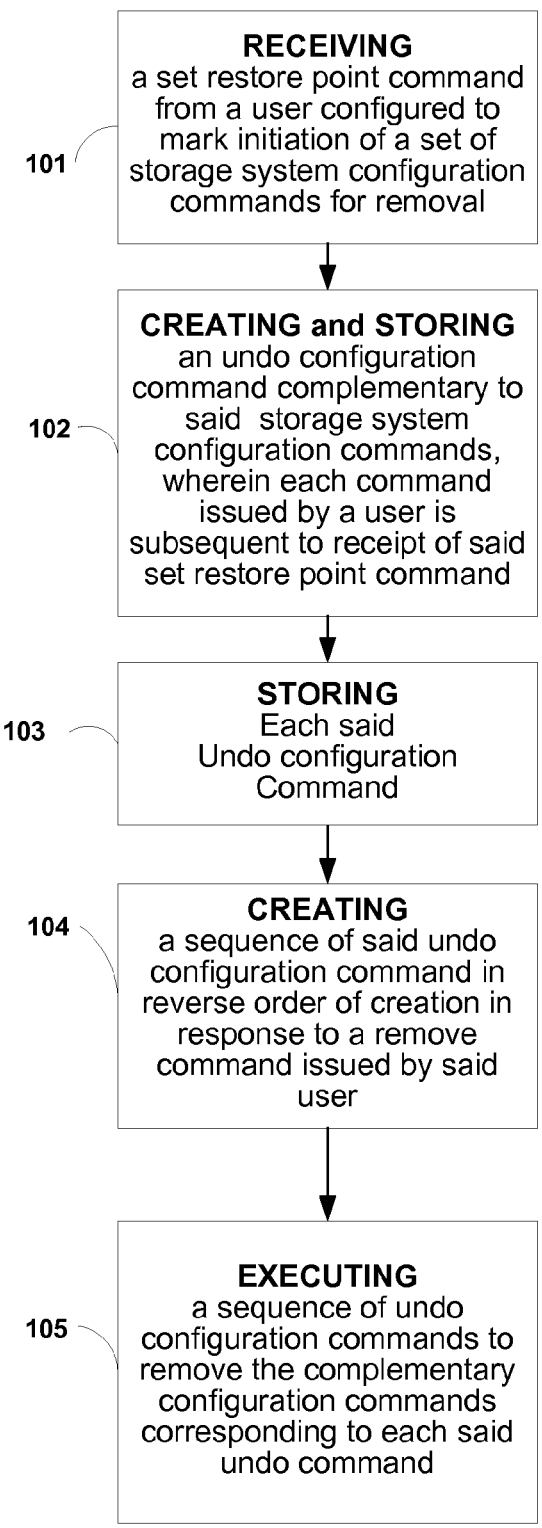
FIG. 1 is an exemplary flow diagram of a method of one embodiment of the invention.

FIG. 1 is an exemplary flow diagram of a method of one embodiment for controlling storage system configuration using a command line interface which allows a user to accurately undo previously issued configuration commands. In particular, step 101 of FIG. 1 is receiving a set restore point command from a user configured to mark initiation of a set of storage system configuration commands for removal. Step 102 is creating and storing an undo configuration command complementary to said storage system configuration commands, wherein each command issued by a user is subsequent to receipt of said set restore point command. Storing each said undo configuration command occurs in step 103. Further, creating a sequence of said undo configuration command in reverse order of creation in response to a remove command issued by said user occurs in step 104. In step 105, executing a sequence of undo configuration commands to remove the complementary configuration commands corresponding to each said undo command is performed.

Figure 2:
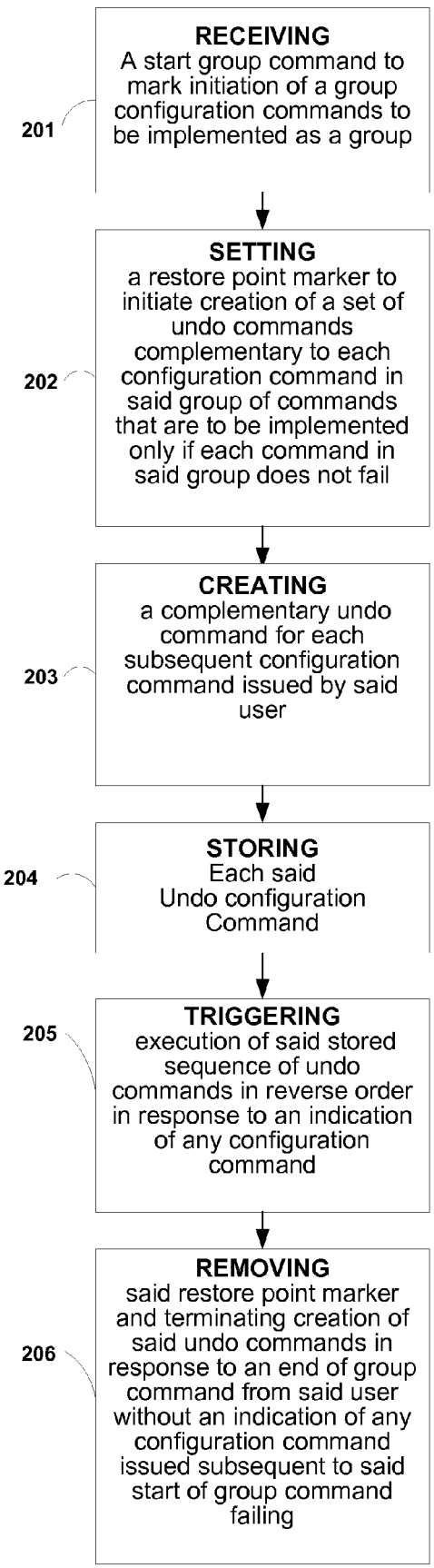
FIG. 2 is another exemplary flow diagram of a method of one embodiment of the invention.

FIG. 2 is another exemplary flow diagram of a method of one embodiment of a method for improving storage system configuration using a command line interface allowing any user selected group of configuration commands to be removed if any configuration command in the group fails. In step 201 of FIG. 2, receiving a start group command to mark initiation of a group of configuration commands to be implemented as a group. Step 202 is setting a restore point marker to initiate creation of a set of undo commands complementary to each configuration command in said group of commands that are to be implemented only if each command in said group does not fail. Creating a complementary undo command for each subsequent configuration command issued by said user occurs in step 203. Storing each said undo command and triggering execution of said stored sequence of undo commands in reverse order of creation in response to an indication of any configuration command issued by said user subsequent to receiving said start group command failing, occur in step 204 and step 205, respectively. Step 206 involves removing said restore point marker and terminating creation of said undo commands in response to an end of group command from said user without an indication of any configuration command issued subsequent to said start of group command failing.

What is claimed is:

1. A method for configuring systems using a command line interface allowing any user selected group of configuration commands to be removed if any configuration command in the group fails, said method comprising:
   receiving a start group command to mark initiation of a group of configuration commands to be implemented as a group;
   setting a restore point marker to initiate creation of a set of undo commands complementary to each configuration command in said group of commands that are to be implemented only if each command in said group does not fail;
   creating a complementary undo command for each subsequent configuration command issued by said user;
   storing each said undo command;
   triggering execution of said stored sequence of undo commands in reverse order of creation in response to an indication of any configuration command issued by said user subsequent to receiving said start group command failing; and
   removing said restore point marker and terminating creation of said undo commands in response to an end of group command from said user without an indication of any configuration command issued subsequent to said start of group command failing.

* * * * *